United States Patent
Kondo et al.

(10) Patent No.: US 10,713,171 B2
(45) Date of Patent: Jul. 14, 2020

(54) COMPUTER SYSTEM

(71) Applicant: Hitachi, Ltd., Tokyo (JP)

(72) Inventors: Nobukazu Kondo, Tokyo (JP); Ken Sugimoto, Tokyo (JP); Yuusuke Fukumura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 448 days.

(21) Appl. No.: 15/507,315

(22) PCT Filed: Oct. 3, 2014

(86) PCT No.: PCT/JP2014/076566
§ 371 (c)(1),
(2) Date: Feb. 28, 2017

(87) PCT Pub. No.: WO2016/051593
PCT Pub. Date: Apr. 7, 2016

(65) Prior Publication Data
US 2017/0308472 A1   Oct. 26, 2017

(51) Int. Cl.
*G06F 12/0862* (2016.01)
*G06F 16/172* (2019.01)
(Continued)

(52) U.S. Cl.
CPC ...... *G06F 12/0862* (2013.01); *G06F 12/0866* (2013.01); *G06F 12/0868* (2013.01);
(Continued)

(58) Field of Classification Search
CPC ............. G06F 12/0862; G06F 12/0866; G06F 12/0868; G06F 12/126; G06F 16/172
See application file for complete search history.

(56) References Cited

U.S. PATENT DOCUMENTS

| 7,266,538 B1 * | 9/2007 | Shatil ................. G06F 12/0862 |
| 7,386,674 B1 * | 6/2008 | Lango .................... G06F 3/061 |
| | | 707/999.202 |

(Continued)

OTHER PUBLICATIONS

NVM Express revision 1.1b specification, Jul. 2, 2014, pp. 1-172.
(Continued)

*Primary Examiner* — Huawen A Peng
(74) *Attorney, Agent, or Firm* — Mattingly & Malur, PC

(57) ABSTRACT

A computer system, comprising first computers, an application operate on each of the first computers; the each of the first computers is coupled to a second computer for providing a storage area; the each of the first computers includes a processor, a memory, a cache device to which a cache area, and a interface; the memory includes a program for realizing an operating system; the operating system includes a cache driver; and a cooperation control module configured to issue a control I/O request for instructing arrangement control; and the cooperation control module generate the control I/O request from a detected I/O request based on a analysis result of the detected I/O request in a case where an issuance of the I/O request from the cache driver is detected; and transfer the control I/O request to an apparatus different from an apparatus of a transfer destination of the detected I/O request.

12 Claims, 6 Drawing Sheets

(51) Int. Cl.
*G06F 12/0868* (2016.01)
*G06F 12/0866* (2016.01)
*G06F 12/126* (2016.01)

(52) U.S. Cl.
CPC .......... *G06F 12/126* (2013.01); *G06F 16/172* (2019.01); *G06F 2212/1024* (2013.01); *G06F 2212/1041* (2013.01); *G06F 2212/154* (2013.01); *G06F 2212/163* (2013.01); *G06F 2212/263* (2013.01); *G06F 2212/311* (2013.01); *G06F 2212/6028* (2013.01)

(56) References Cited

U.S. PATENT DOCUMENTS

| | | | |
|---|---|---|---|
| 7,761,591 B2* | 7/2010 | Graham | G06Q 40/02 709/204 |
| 8,171,102 B2* | 5/2012 | Gladwin | H04L 67/1097 370/352 |
| 2004/0078518 A1* | 4/2004 | Kuwata | G06F 12/123 711/113 |
| 2005/0154825 A1* | 7/2005 | Fair | G06F 3/0611 711/113 |
| 2012/0054436 A1* | 3/2012 | Duvvuru | G06F 12/0862 711/118 |
| 2013/0262533 A1 | 10/2013 | Mitra et al. | |

OTHER PUBLICATIONS

International Search Report of PCT/JP2014/076566 dated Jan. 6, 2015.

\* cited by examiner

231

MONITORING INFORMATION  
302

| TRANSFER DESTINATION 301 | COMMAND | | | | ID 303 |
|---|---|---|---|---|---|
| | ADDRESS 311 | COMMAND TYPE 312 | DATA 313 | DATASET MANAGEMENT 314 | HINT INFORMATION 315 |
| CACHE MEMORY SYSTEM | * | R/W | * | — | ACCESSED AGAIN IN THE NEAR FUTURE | 1 |
| CACHE MEMORY SYSTEM | * | R | — | ACCESS FREQUENCY: FREQUENT | SEQUENTIAL ACCESS | 2 |
| CACHE MEMORY SYSTEM | * | R | — | ACCESS FREQUENCY: INFREQUENT | SEQUENTIAL ACCESS | 3 |
| ... | ... | ... | ... | ... | ... | ... |

FIG. 3

| 232 → | CONVERSION INFORMATION 403 | | | | | |
|---|---|---|---|---|---|---|
| | | | COMMAND | | | |
| 401 ID | 402 TRANSFER DESTINATION | 411 ADDRESS | 412 COMMAND TYPE | 413 DATA | 414 DATASET MANAGEMENT | 415 HINT INFORMATION |
| 1 | STORAGE SYSTEM | ORIGINAL | R/W | ORIGINAL | — | NO FREQUENT ACCESS |
| 2 | STORAGE SYSTEM | ORIGINAL | R | — | ORIGINAL | NO FREQUENT ACCESS |
| 3 | STORAGE SYSTEM | ORIGINAL +OFFSET | R | — | ORIGINAL | ACCESSED AGAIN IN THE NEAR FUTURE |
| ... | ... | ... | ... | ... | ... | ... |

FIG. 4

COMPUTER SYSTEM

BACKGROUND OF THE INVENTION

This invention relates to cache control in I/O processing using cache areas of servers and storage systems.

In recent years, application of a nonvolatile memory, for example, a flash memory, to servers and shared storage apparatus is in progress. The non-volatile memory express (NVMe) is proposed as an I/O stack intended for the nonvolatile memory.

The NVMe is an I/O stack that reduces a CPU load imposed by I/O processing compared with existing I/O stacks in order to take advantage of a high speed property of the nonvolatile memory. Therefore, the speed of an application having the CPU load as a bottleneck can be increased by using the NVMe. It is expected that the NVMe is used more frequently from now on.

In the NVMe, extensions of commands issued during the I/O processing are proposed. Hint information is known as one of such extensions (refer "NVM Express revision 1.1b specification", 6.7.1 Context Attribute). The hint information is information indicating how data to be accessed is used by the application.

SUMMARY OF THE INVENTION

In a computer coupled to a cache memory system constructed by the nonvolatile memory and a storage system constructed by a storage medium, in order to simultaneously realize processing performance of an application and effective use of storage areas, the respective systems need to cooperate with each other to control an arrangement of data. As a system in which a computer and a storage system cooperate with each other, for example, a technology disclosed in U.S. 2013/0262533 A1 is known.

In U.S. 2013/0262533 A1, there is a description that: the method may include receiving an I/O request from a file system layer and checking the I/O request for file system contextual information. The method may also include accessing the file system layer to determine attributes of the file system contextual information and receiving the attributes of the file system contextual information from the file system layer. The method may further include analyzing attributes of the file system contextual information and generating a hint based upon analyzing the attributes of the file system contextual information. The method may include a mechanism to provide weight-age of data passed from the application. Moreover, in U.S. 2013/0262533 A1, there is a description that: the hint may be associated with the I/O request, and the hint may comprise hotness information to increase efficiency of data accessibility at a lower level storage tier. The method may include sending the hint to the lower level storage tier.

However, in U.S. 2013/0262533 A1, hierarchical control for the storage system is disclosed, but hierarchical control in which the cache memory system and the storage system cooperate with each other is not considered. Moreover, in U.S. 2013/0262533 A1, hierarchical control of using commands extended for the NVMe in a computer system including a hierarchical storage area is not considered.

In a case where hints are transmitted to the cache memory system and the storage system, the hints have the same content, and thus the cache memory system and the storage system may carry out the same control processing. Therefore, efficient hierarchical control in the computer system cannot be realized.

Moreover, the commands extended for the NVMe are used for the cache memory system, and are thus used for the hierarchical control for the cache memory system, but are not used for the hierarchical control for the storage system. Therefore, the commands cannot directly be used for the hierarchical control for the storage system.

This invention has an object to provide a computer system including a hierarchical storage area and being configured to control an arrangement of data through use of a command (I/O request) including hint information.

The present invention can be appreciated by the description which follows in conjunction with the following figures, wherein: a computer system comprises a plurality of first computers, each of the plurality of first computers is configured to execute an application; each of the plurality of first computers is coupled to a second computer for providing a storage area. Data to be used by the application is stored in the storage area provided by the second computer. Each of the plurality of first computers includes a first processor, a first memory, a cache device to which a cache area for temporarily storing data is set, and a first interface for coupling to another apparatus. The second computer includes a controller including a second processor, a second memory, and a second interface for coupling to another apparatus, and a plurality of storage apparatus. The first memory includes a program for realizing an operating system for controlling the first computer. The operating system includes: a cache driver configured to control data stored in the cache area, and a cooperation control module configured to issue a control I/O request for instructing arrangement control for subject data in the computer system based on an analysis result of an I/O request including identification information on an apparatus of a transfer destination and an address for access to the subject data. The cooperation control module is configured to: analyze an I/O request in a case where an issuance of the I/O request from the cache driver is detected; determine whether hint information on how the subject data is used by the application is included in the detected I/O request based on an analysis result of the detected I/O request; generate the control I/O request from the detected I/O request based on the analysis result of the detected I/O request in a case where it is determined that the hint information is included in the detected I/O request; and transfer the control I/O request to an apparatus different from an apparatus of a transfer destination of the detected I/O request.

According to this invention, in a case where an I/O request including hint information is detected, the cooperation control module can transmit a control I/O request for carrying out hierarchical control processing to an apparatus different from an apparatus of the transfer destination of the I/O request. As a result, the first computer and the second computer can cooperate with each other, and, simultaneously, the arrangement of the data in the computer system can be appropriately controlled.

Objects, configurations, and effects other than those described above become apparent from the following descriptions of embodiments of this invention.

BRIEF DESCRIPTION OF THE DRAWINGS

The present invention can be appreciated by the description which follows in conjunction with the following figures, wherein:

FIG. 3 is an explanatory diagram for showing an example of monitoring information held by a cooperation control module according to the first embodiment;

FIG. 4 is an explanatory diagram for showing an example of conversion information held by the cooperation control module according to the first embodiment;

DETAILED DESCRIPTION OF THE PREFERRED EMBODIMENTS

Figure 1:
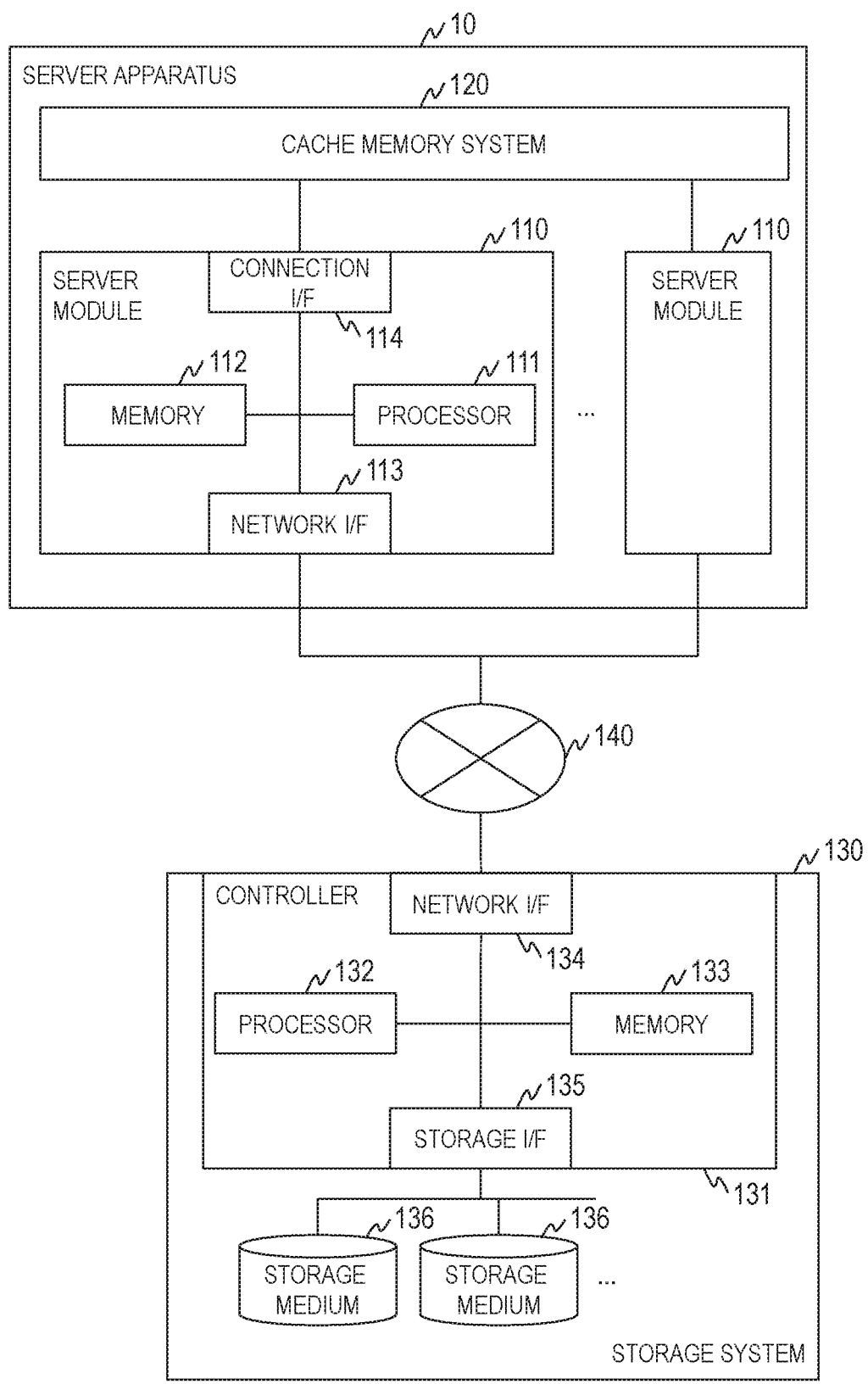
FIG. 1 is a block diagram for illustrating an example of a hardware configuration of a computer system according to a first embodiment of this invention.

Now, embodiments of this invention are described in detail referring to the drawings.

First Embodiment

Figure 2:
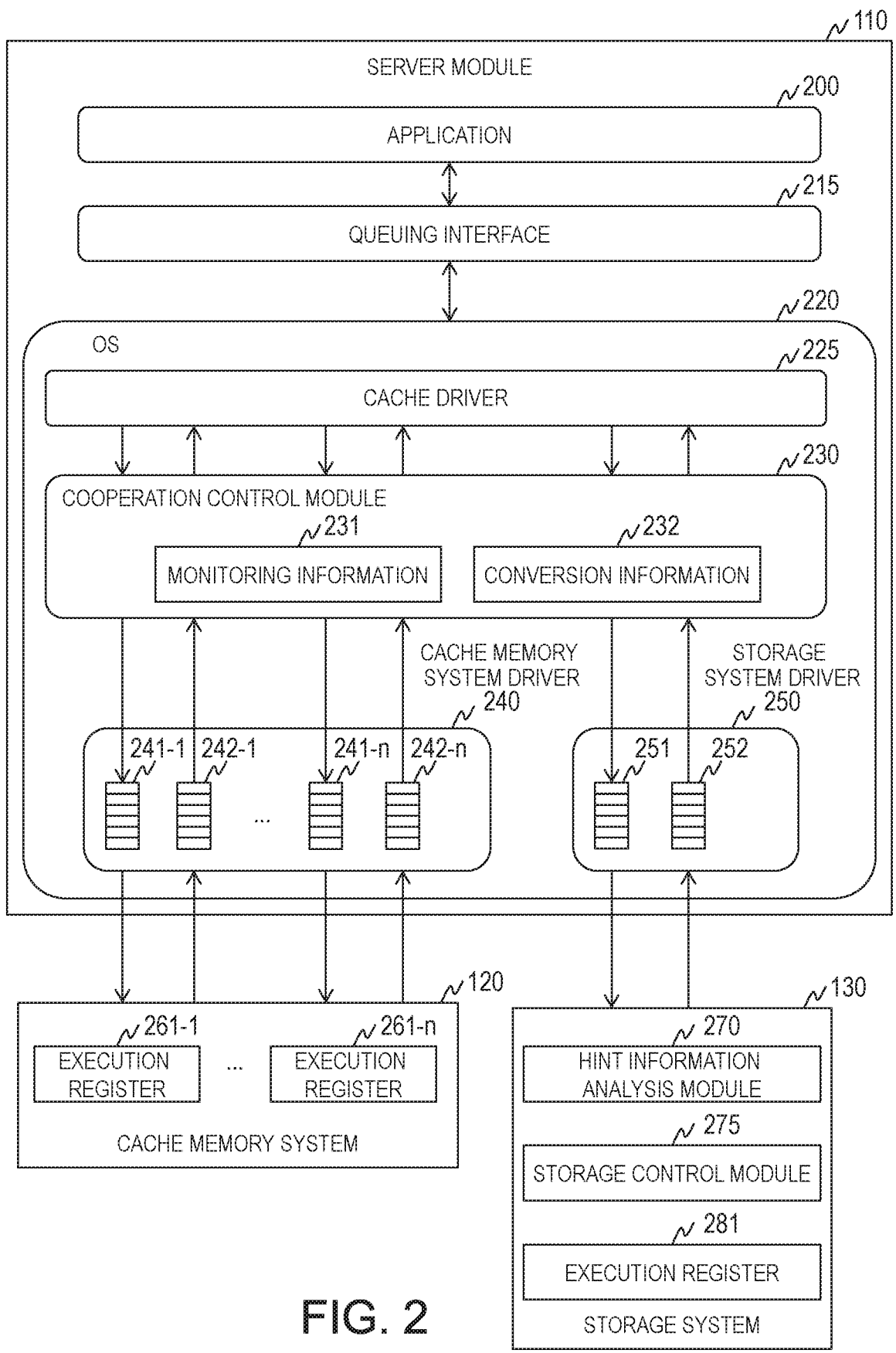
FIG. 2 is an explanatory diagram for illustrating an example of a software configuration of the computer system according to the first embodiment.

FIG. 1 is a block diagram for illustrating an example of a hardware configuration of a computer system according to a first embodiment of this invention. FIG. 2 is an explanatory diagram for illustrating an example of a software configuration of the computer system according to the first embodiment.

The computer system according to this invention includes a server apparatus 10 and a storage system 130. The computer system may include a computer having the same function as that of the storage system 130 in place of the storage system 130.

The server apparatus 10 and the storage system 130 are coupled to each other via a network 140. A WAN, a LAN, a SAN, and other similar network are conceivable as the network 140. This invention is not limited depending on the type of the network. The server apparatus 10 and the storage system 130 may be directly coupled to each other in accordance with a connection standard, for example, PCIExpress, Fibre Channel, or InfiniBand, without intervention of a network switch and the like.

The server apparatus 10 includes a plurality of server modules 110 and a cache memory system 120. A connection standard, for example, PCIExpress, is used for coupling between one server module 110 and the cache memory system 120. PCIExpress is hereinafter referred to as PCIe.

The server module 110 is a computer for executing a predetermined application 200. The server module 110 includes a processor 111, a memory 112, a network interface 113, and a connection interface 114, and those respective components are coupled to one another via internal paths. The server module 110 may include other components which are not shown in the drawings, for example, a storage medium and an input/output apparatus.

The processor 111 is configured to execute programs stored in the memory 112. Functions of the server module 110 are realized by the processor 111 executing the programs stored in the memory 112.

The memory 112 is configured to store the programs to be executed by the processor 111 and information necessary to execute the programs. Moreover, the memory 112 includes a work area to be used by the programs. The programs and the information stored in the memory 112 are described later.

The network interface 113 is an interface for coupling to another apparatus via the network 140.

The connection interface 114 is an interface for coupling to the cache memory system 120. As described above, according to this embodiment, the server module 110 and the cache memory system 120 are coupled to each other via a communication path, for example, a PCIe bus. In this case, a PCIe interface is used as the connection interface 114.

The cache memory system 120 is configured to provide a large-capacity cache area to be used by the server modules 110. The cache memory system 120 is constructed by a nonvolatile memory (nonvolatile memory element), for example, a flash memory. The cache memory system 120 includes a controller (not shown) for carrying out control for the nonvolatile memory.

According to the first embodiment, cache data in units of a logical block of a logical unit (LU) provided by the storage system 130 is stored in the cache area provided by the cache memory system 120.

Moreover, according to the first embodiment, the plurality of server modules 110 are configured to share and use one cache memory system 120. This invention is not limited to this configuration, and one cache memory system 120 may be coupled to one server module 110. Moreover, the cache memory system 120 may exist in the server module 110. Further, the cache memory system 120 may exist outside the server apparatus 10.

Moreover, according to the first embodiment, the cache memory system 120 constructed by the nonvolatile memory is used, but a cache memory system constructed by a volatile memory may be used.

The storage system 130 is configured to provide a storage area for storing data and the like used by the application 200 illustrated in FIG. 2, which is executed on each of the server modules 110. The storage system 130 includes a controller 131 and a plurality of storage media 136.

The controller 131 is configured to control the storage system 130. The controller 131 includes a processor 132, a memory 133, a network interface 134, and a storage interface 135, and those respective components are coupled to one another via internal paths.

The processor 132 is configured to execute programs stored in the memory 133. Functions of the storage system 130 are realized by the processor 132 executing the programs stored in the memory 133.

The memory 133 is configured to store the programs to be executed by the processor 132 and information necessary to execute the programs. Moreover, the memory 133 includes a work area to be used by the programs. The programs and the information stored in the memory 133 are described later.

The network interface 134 is an interface for coupling to another apparatus via the network 140.

The storage interface 135 is an interface for coupling to the storage media 136. The storage medium 136 is an apparatus for storing the data. For example, a hard disk drive (HDD) or a solid state drive (SSD) is conceivable as the storage medium 136. The storage medium 136 may be any apparatus as long as the apparatus can store the data. According to the first embodiment, the storage system 130 is configured to use the plurality of storage media 136 to construct a RAID.

The storage system 130 according to the first embodiment includes a cache area (not shown) for the storage system 130, and a plurality of volumes (not shown).

The cache area for the storage system 130 is a cache area realized by the memory 133 or the like. Data accessed by the server module 110 is temporarily stored in the cache area for the storage system 130. The volume is a storage area generated by RAID volumes having different access performance, and is a storage area for realizing the LU provided for the server module 110.

The storage system 130 according to the first embodiment constructs a hierarchical storage area. Specifically, the storage system 130 includes a RAID volume constructed by a plurality of storage media 136 having high access performance and a RAID volume constructed by a plurality of storage media 136 having low access performance. One or more LUs are generated from each of the RAID volumes, and the generated LUs are assigned to the server module 110.

The storage system 130 can store data in the cache area for the storage system 130, thereby responding at high speed to access from the server module 110. Moreover, the storage system 130 can change the LU assigned to the server module 110, thereby changing a layer on which the data is stored.

A description is now given of a software configuration of the server module 110, the cache memory system 120, and the storage system 130.

The memory 112 of the server module 110 stores programs for respectively realizing at least one application 200, a queuing interface 215, and an OS 220. Each of the programs is executed by the processor 111. According to the first embodiment, one application 200 is assumed to operate on the server module 110 for the sake of simplifying the description.

The application 200 is configured to carry out a predetermined task. This invention is independent of the type of the application 200. The application 200 according to the first embodiment has a function of issuing an I/O request including hint information or a function of controlling a transaction including the hint information. The application 200 can cause the hint information to be included in a dedicated command for operating a database or the like. As used herein, the hint information refers to information that indicates how data to be accessed is used by the application 200.

The application 200 may not always need to have the function of issuing an I/O request including the hint information or the function of controlling a transaction including the hint information. In this case, an agent (not shown) for monitoring an access request output from the queuing interface 215 or the application 200 causes the hint information to be included in the I/O request, a start instruction for the transaction, or the like.

The queuing interface 215 is configured to control I/Os among the application 200, the cache memory system 120, and the storage system 130. Specifically, the queuing interface 215 is configured to register the I/O request to the queue, and control the execution of the I/O request registered to the queue. According to this embodiment, an interface compliant with the NVMe is used as the queuing interface 215.

The queuing interface 215 is configured to provide an application queue for the application 200. According to the first embodiment, the queuing interface 215 is configured to provide at least one application queue for one application 200.

The queuing interface 215 may be included in the application 200 or the OS 220. Moreover, the queuing interface 215 is not limited to the interface compliant with the NVMe.

The OS 220 is configured to control the entire server module 110. The OS 220 includes a cache driver 225, a cooperation control module 230, a cache memory system driver 240, and a storage system driver 250.

The OS 220 is configured to format the LU provided by the storage system 130 into a predetermined file system. On this occasion, the OS 220 divides the LU into predetermined logical blocks, and assigns an identification number to each of the logical blocks.

A file system is configured to manage data constructed by one or more pieces of block data as a file. The file system and the like included in the OS 220 are publicly known, and a description thereof is thus omitted.

The cache driver 225 is a driver for controlling the cache data stored in the cache area. For example, the cache driver 225 is configured to carry out the following cache control processing in a case where a read request is received from the application 200.

First, the cache driver 225 determines whether or not data to be read is stored in the cache area of the cache memory system 120. In a case where the data to be read is stored in the cache area, the cache driver 225 reads the data from the cache area, and returns the read data to the application 200.

In a case where the data to be read is not stored in the cache area, the cache driver 225 registers a read request directed to the storage system 130 to the queue of the storage system driver 250, and reads the data from the storage system 130 based on the read request. Then, the cache driver 225 returns the read data to the application 200.

The cache driver 225 according to the first embodiment has a function of issuing at least any one of a normal I/O request and an I/O request including hint information in order to realize the above-mentioned cache control processing.

The cooperation control module 230 is configured to issue a control I/O request based on an analysis result of an I/O request including hint information. Specifically, in a case where the cooperation control module 230 detects an I/O request including hint information, the cooperation control module 230 analyzes the I/O request, and generates a control I/O request based on the analysis result. Moreover, the cooperation control module 230 transfers the control I/O request to a transfer destination different from a transfer destination of the I/O request including the hint information.

The control I/O request is an I/O request for realizing I/O processing for controlling an arrangement of data in a computer system constructing a hierarchical storage area (hierarchical storage). The control I/O request includes hint information converted based on the analysis result of the I/O request including the hint information.

The cooperation control module 230 is configured to hold monitoring information 231 and conversion information 232. The monitoring information 231 stores information for determining whether or not the cooperation control module 230 issues a control I/O request. Referring to FIG. 3, a detailed description is later given of the monitoring information 231. The conversion information 232 stores information for the cooperation control module 230 to generate a control I/O request. Referring to FIG. 4, a detailed description is later given of the conversion information 232.

The cache memory system driver 240 is configured to control access to the cache memory system 120. The cache memory system driver 240 includes a plurality of pairs of an execution queue 241 and a completion queue 242. The pair of the execution queue 241 and the completion queue 242 is hereinafter also referred to as a cache queue.

The execution queue 241 is a queue for registering an I/O request. The completion queue 242 is a queue for registering a response to the I/O request. According to the embodiment, at least one cache queue is assigned to one application 200. As a result, efficient cache control can be realized.

The storage system driver 250 is configured to control access to the storage system 130. The storage system driver 250 includes at least one pair of an execution queue 251 and a completion queue 252.

The controller of the cache memory system 120 includes a plurality of execution registers 261 respectively corresponding to the plurality of cache queues. The number of the execution registers 261 is the same as the number of the cache queues (number of the pairs). In the example illustrated in FIG. 1, an execution register 261-1 is associated with a pair of an execution queue 241-1 and a completion queue 242-1, and an execution register 261-n is associated with a pair of an execution queue 241-n and a completion queue 242-n.

The memory 133 of the storage system 130 is configured to store programs for respectively realizing a hint information analysis module 270 and a storage control module 275. Each of the programs is executed by the processor 132.

The hint information analysis module 270 is configured to monitor a control I/O request, analyze the control I/O request, and output an analysis result and the control I/O request to the storage control module 275.

The storage control module 275 is configured to control the storage system 130. The storage control module 275 logically divides the RAID volume, thereby generating a plurality of logical units (LUs), and provides the generated plurality of LUs for the server module 110. Moreover, the storage control module 275 manages correspondence among the LUs, the RAID volumes, and the storage media 136.

Moreover, the controller 131 of the storage system 130 includes an execution register 281 corresponding to the pair of the execution queue 251 and the completion queue 252 included in the storage system driver 250.

In a case where the storage control module 275 receives an I/O request from the server module 110 to an LU via the execution register 281, the storage control module 275 accesses the storage media 136 for providing a storage area (logical block) constructing the LU based on the management information.

The storage control module 275 includes various functions, for example, a management function for the LUs, a data transfer function, and a cache control function, but those functions are publicly known technologies, and are thus not detailed.

In FIG. 2, the cache driver 225 and the cooperation control module 230 are illustrated as independent components, but the cache driver 225 may include the cooperation control module 230. Moreover, in FIG. 2, the storage control module 275 and the hint information analysis module 270 are illustrated as independent components, but the storage control module 275 may include the hint information analysis module 270.

FIG. 3 is an explanatory diagram for showing an example of the monitoring information 231 held by the cooperation control module 230 according to the first embodiment.

The monitoring information 231 includes a plurality of entries for defining I/O requests subject to the issuance of the control I/O requests. The entry of the monitoring information 231 includes a transfer destination 301, a command 302, and an ID 303.

The transfer destination 301 is a column for storing identification information on a device or a system to which an I/O request including hint information is transferred. According to the first embodiment, the transfer destination 301 stores any one of identification information on the cache memory system 120 and identification information on the storage system 130. The identification information stored in the transfer destination 301 only needs to be information for uniquely identifying the cache memory system 120 and the storage system 130, and an identification name, an address, and the like are conceivable as the information.

The command 302 is a column for storing specific contents of the I/O request. The command 302 according to the first embodiment includes an address 311, a command type 312, data 313, dataset management 314, and hint information 315.

The address 311 is a column for storing an address of a storage area to be accessed by the I/O request. The address 311 stores, for example, a logical block address (LBA). The address 311 of each of the entries of FIG. 3 stores a symbol representing a wildcard indicating an arbitrary string.

The command type 312 is a column for storing an operation type of the I/O request. The command type 312 according to the first embodiment stores "R" representing read processing of data or "W" representing write processing of data. The first entry of FIG. 3 indicates that this entry corresponds to both "R" and W.

The data 313 is a column for storing data of the I/O request corresponding to the write processing of data. The data 313 stores data itself to be written or a name or the like of the data. In a case where a hyphen is stored in the data 313, this case indicates that the I/O request does not include data.

The dataset management 314 is a column for storing information representing an attribute of the data to be stored in a predetermined storage area. The dataset management 314 stores, for example, a read frequency, a write frequency, and an access size. In a case where a hyphen is stored in the dataset management 314, this case indicates that the dataset management is not set to the I/O request.

The hint information 315 is a column for storing information representing a tendency of usage by the application 200 of the data to be stored in the predetermined storage area.

The hint information 315 stores "accessed again in the near future", "sequential access", "no access for a while", "compression applicable/not applicable (to be compressed/not to be compressed)", "tolerance to latency (for example, "fast response unnecessary")", and the like. "Accessed again in the near future" indicates that access is made again in the near future after the access by the application 200. "Sequential access" indicates sequential read processing or sequential write processing to be carried out by the application 200.

The command 302 only needs to include at least one of the hint information 315, the address 311, the command type 312, the data 313, and the dataset management 314. Moreover, the command 302 may include columns other than the address 311, the command type 312, the data 313, the dataset management 314, and the hint information 315.

The ID 303 is a column for storing an identification number of an entry included in the conversion information 232. As described later, in a case where the cooperation control module 230 detects an I/O request matching an arbitrary entry of the monitoring information 231, the cooperation control module 230 refers to the conversion information 232 based on the ID 303 of this entry, and generates a control I/O request based on information contained in the entry of the conversion information 232.

FIG. 4 is an explanatory diagram for showing an example of the conversion information 232 held by the cooperation control module 230 according to the first embodiment.

The conversion information 232 includes a plurality of entries for storing information for generating a control I/O request from an I/O request including hint information. The entry of the conversion information 232 includes an ID 401, a transfer destination 402, and a command 403.

The ID 401 is a column for storing an identifier for uniquely identifying an entry included in the conversion information 232. The transfer destination 402 is a column for storing identification information on a device or a system to which a control I/O request is transferred. The transfer destination 402 stores any one of identification information on the cache memory system 120 and identification information on the storage system 130.

The command 403 is a column for storing information for generating the control I/O request based on the I/O request including hint information. The command 403 according to the first embodiment includes an address 411, a command type 412, data 413, dataset management 414, and hint information 415.

The address 411 is a column for storing a conversion rule of an address of a storage area set to the control I/O request. In a case where "original" is stored in the address 411, this case indicates that the same address as the address 311 of an I/O request including hint information is set to the control I/O request. In a case where "original+offset" is stored in the address 411, this case indicates that an address acquired by adding a predetermined offset to the address 311 of the I/O request including the hint information is set to the control I/O request.

The command type 412 is a column for storing an operation type set to the control I/O request. The data 413 is a column for storing a conversion rule of data set to the control I/O request corresponding to the write processing. In a case where "original" is stored in the data 413, this case indicates that the same data as the data of the I/O request including the hint information is set to the control I/O request. Moreover, in a case where a hyphen is stored in the data 413, this case represents that data is not set to the control I/O request.

The dataset management 414 is a column for storing a conversion rule of dataset management set to the control I/O request. In a case where "original" is stored in the dataset management 414, this case indicates that the same dataset management as the dataset management 314 of the I/O request including the hint information is set to the control I/O request. Moreover, in a case where a hyphen is stored in the dataset management 414, this case indicates that the dataset management is not set to the control I/O request.

The hint information 415 is a column for storing hint information set to the control I/O request. The hint information 415 according to the first embodiment stores information for realizing hierarchical control for data subject to the I/O request including the hint information. For example, in a case where the transfer destination 301 is "cache memory system", and the hint information 315 is "accessed again in the near future", "no frequent access" is stored in the hint information 415. "No frequent access" indicates that access is not made to data corresponding to the data 413 for a certain period.

In the case of the above-mentioned I/O request, the application 200 is planned to access the data stored in the cache memory system 120, and the data is thus not removed from the cache memory system 120. Thus, the server module 110 does not need to access the storage system 130, and "no frequent access" is stored in the hint information 415 of the control I/O request.

A description is now given of correspondence between the monitoring information 231 of FIG. 3 and the conversion information 232 of FIG. 4.

In the case of the first entry of the monitoring information 231, the write processing or the read processing is carried out for the data stored in the cache memory system 120 in the near future. Therefore, the data stored in the cache area is not removed from the cache area. In this case, access to the data stored in the storage system 130 does not occur, and the storage system 130 can carry out the following hierarchical control by setting "no frequent access" as the hint information included in the control I/O request.

(1) In a case where the data is stored in the cache area for the storage system 130, the storage system 130 deletes the data from the cache area.

(2) In a case where the data is stored in a storage area having high access performance, the storage system 130 migrates the data to a storage area having low access performance.

As a result of the hierarchical control of (1) and (2), the cache area and the storage areas of the storage system 130 can effectively be used.

In the case of a second entry of the monitoring information 231, the data is sequentially read, and the data is frequently read. Therefore, the data is not removed from the cache area. In this case, access to the data stored in the storage system 130 does not occur, and thus the storage system 130 can carry out the hierarchical control described in (1) and (2) above by setting "no frequent access" as the hint information included in the control I/O request. For example, in a case where the application 200 carries out analysis processing, I/O performance increases, and storage areas of the storage system 130 can effectively be used.

In the case of a third entry of the monitoring information 231, the data is sequentially read, and the data is not frequently read. Therefore, the data is removed from the cache area, and when subsequent access is made to this data, access to the storage system 130 occurs. In this case, the storage system 130 can carry out the following hierarchical control by setting "accessed again in the near future" as the hint information included in the control I/O request.

(3) The storage system 130 migrates data planned to be accessed to a storage area having high access performance in order to prepare for prefetching to the cache area of the storage system 130.

(4) The storage system 130 reads a part of the data to the cache area of the storage system 130.

As a result of the hierarchical control of (3) and (4), the storage system 130 can transmit the data at high speed to the server module 110. Thus, processing performance of the application 200 can be increased.

The cooperation control module 230 according to the first embodiment holds the monitoring information 231 and the conversion information 232 as independent pieces of information, but the monitoring information 231 and the conversion information 232 may be combined to be managed as one piece of conversion information.

Figure 5:
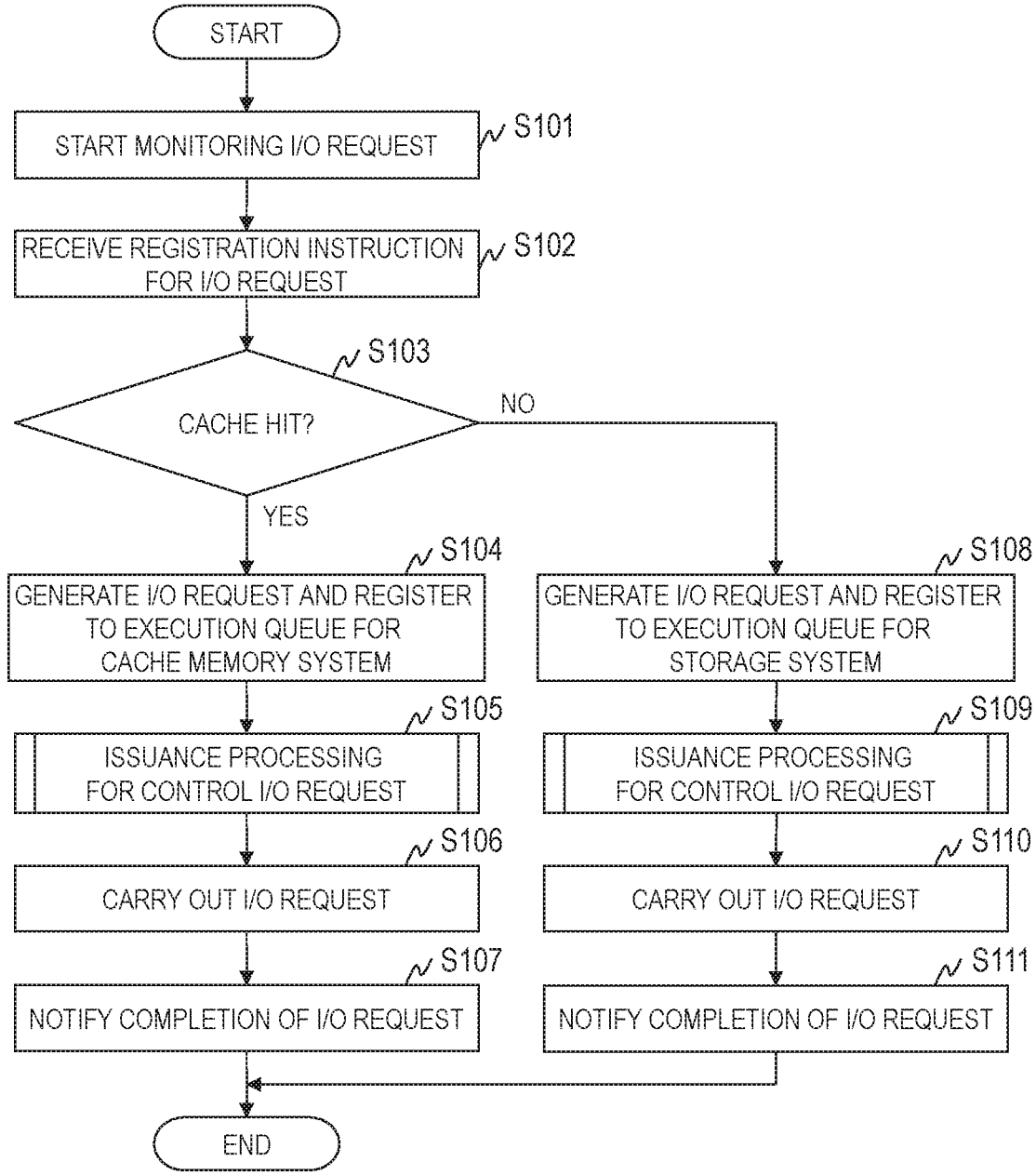
FIG. 5 is a flowchart for illustrating an example of I/O processing carried out by an OS according to the first embodiment.
Figure 6:
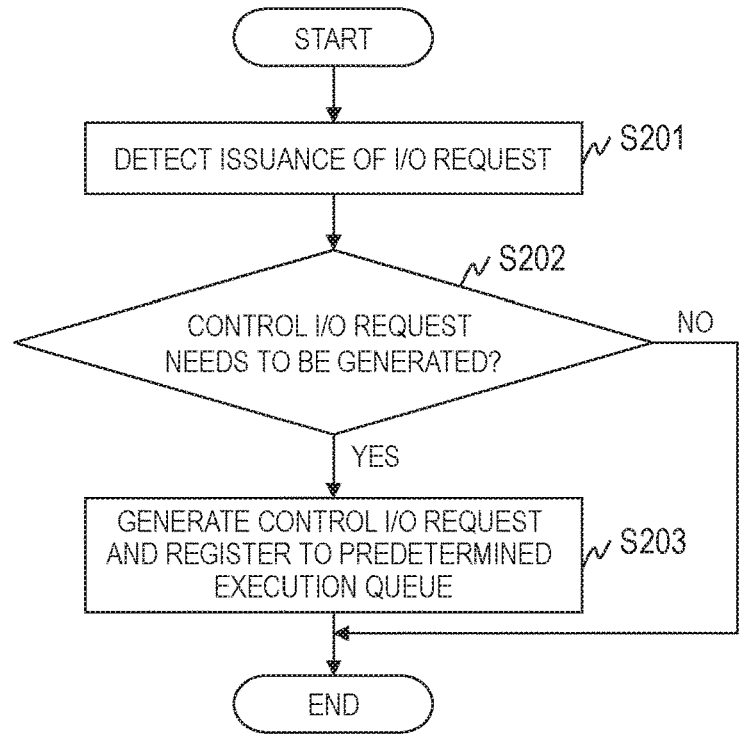
FIG. 6 is a flowchart for illustrating an example of issuance processing for a control I/O request carried out by the cooperation control module according to the first embodiment.

Referring to FIG. 5 and FIG. 6, a detailed description is now given of the I/O processing carried out by the server module 110 according to the first embodiment.

FIG. 5 is a flowchart for illustrating an example of the I/O processing carried out by the OS 220 according to the first embodiment.

The OS 220 starts monitoring an I/O request after the OS 220 boots (Step S101). Specifically, the OS 220 invokes the cooperation control module 230, and instructs the monitoring of an I/O request. In a case where the cooperation control module 230 is realized as a program module, the OS 220 loads this program module to the memory 112, and executes the program module.

In a case where the OS 220 receives an instruction to register an I/O request to the application queue from the application 200 (Step S102), the OS 220 invokes the cache driver 225.

In a case where the application 200 instructs the registration of an I/O request, the application 200 carries out the following processing. First, the application 200 determines a storage area (destination address) for storing subject data, the subject data, and an identification number of the application queue. The application 200 uses the queuing interface 215 to input the registration instruction for the I/O request including the type of the I/O request, the destination address, the subject data, and the application queue number. The application 200 can assign hint information to the registration instruction for the I/O request as necessary.

The cache driver 225 determines whether or not the subject data is stored in the cache area of the cache memory system 120 (Step S103). In other words, whether or not a cache hit has occurred is determined.

In a case where it is determined that the subject data is stored in the cache area, the OS 220 generates an I/O request including hint information, and registers this I/O request to a predetermined execution queue 241 (Step S104). In other words, the I/O request is issued.

In a case where the cooperation control module 230 detects the issuance of the I/O request, the cooperation control module 230 carries out issuance processing for a control I/O request (Step S105). Referring to FIG. 6, a detailed description is later given of the issuance processing for a control I/O request.

The OS 220 carries out the I/O request registered to the execution queue 241 in accordance with a predetermined schedule (Step S106), and notifies the application 200 of completion of the I/O request (Step S107). Then, the OS 220 finishes the I/O processing. Specifically, the following processing is carried out.

The OS 220 instructs the cache memory system driver 240 to carry out the I/O request registered to the execution queue 241. The cache memory system driver 240 instructs the cache memory system 120 to carry out the I/O request via the execution register 261 corresponding to the I/O request registered to the execution queue 241.

After the processing for the I/O request has been completed, the cache memory system driver 240 registers a response to this I/O request to the completion queue 242 corresponding to the execution queue 241 to which this I/O request is registered.

In a case where the OS 220 detects the registration of the response to the completion queue 242, the OS 220 reads the response from the completion queue 242, and notifies the application 200 of the completion of the I/O processing.

In a case where it is determined that the subject data is not stored in the cache area in Step S103, the OS 220 generates an I/O request including the hint information, and registers this I/O request to a predetermined execution queue 251 (Step S108).

In a case where the cooperation control module 230 detects the issuance of the I/O request, the cooperation control module 230 carries out issuance processing for a control I/O request (Step S109). Referring to FIG. 6, a detailed description is later given of the issuance processing for a control I/O request.

The OS 220 carries out the I/O request registered to the execution queue 251 in accordance with a predetermined schedule (Step S110), and notifies the application 200 of completion of the I/O request (Step S111). Then, the OS 220 finishes the I/O processing. Specifically, the following processing is carried out.

The OS 220 instructs the storage system driver 250 to carry out the I/O request registered to the execution queue 251. The storage system driver 250 instructs the storage system 130 to carry out the I/O request via the execution register 281 corresponding to the I/O request registered to the execution queue 251.

After the processing for the I/O request has been completed, the storage system driver 250 registers a response to this I/O request to the completion queue 252.

In a case where the OS 220 detects the registration of the response to the completion queue 252, the OS 220 reads the response from the completion queue 252, and notifies the application 200 of the completion of the I/O processing.

FIG. 6 is a flowchart for illustrating an example of the issuance processing for a control I/O request carried out by the cooperation control module 230 according to the first embodiment.

The cooperation control module 230 monitors an I/O request registered to the execution queue 241 or the execution queue 251, namely, an I/O request issued by the cache driver 225. As a method of monitoring an I/O request, a method of directly receiving an I/O request from the cache driver 225 by the cooperation control module 230 and a method of using snooping are conceivable.

In a case where the cooperation control module 230 detects an issuance of an I/O request (Step S201), the cooperation control module 230 analyzes this I/O request, thereby determining whether or not a control I/O request needs to be generated. Specifically, the following processing is carried out.

The cooperation control module 230 analyzes the I/O request issued by the cache driver 225. As a result, the apparatus (device) of the transfer destination of the I/O request, the address of the storage area to which access is made, the command type, the hint information, and the like can be acquired.

The cooperation control module 230 determines whether or not hint information is included in the issued I/O request based on the analysis result of the I/O request. In a case where it is determined that hint information is not included in the issued I/O request, the cooperation control module 230 determines that a control I/O request does not need to be generated.

In a case where it is determined that hint information is included in the issued I/O request, the cooperation control module 230 refers to the monitor information 231 based on the analysis result of the I/O request, and searches the monitor information 231 for an entry matching this I/O request. Specifically, the cooperation control module 230 refers to the values of all the columns, which are the transfer destination 301, the address 311, the command type 312, the data 313, the dataset management 314, and the hint information 315, and searches for an entry in which the values in all the columns match values included in the control I/O request.

In a case where an entry matching the detected I/O request does not exist, the cooperation control module 230 determines that a control I/O request does not need to be generated. On the other hand, in a case where an entry matching the detected I/O request exists, the cooperation control module 230 determines that a control I/O request needs to be generated. A description has been given of the processing in Step S202.

In a case where it is determined that a control I/O request does not need to be generated, the cooperation control module 230 finishes the processing.

In a case where it is determined that a control I/O request needs to be generated, the cooperation control module 230 refers to the conversion information 232, generates a control I/O request from the issued I/O request, and registers the control I/O request to a predetermined execution queue (Step S203). Then, the cooperation control module 230 finishes the processing. In Step S203, the hint information included in the issued I/O request is converted based on the conversion information 232, and the control I/O request including the converted hint information is generated. Specifically, the following processing is carried out.

The cooperation control module 230 searches for an entry in which a value in the ID 401 of the conversion information 232 matches a value in the ID 303 of the entry retrieved from the monitoring information 231. The cooperation control module 230 generates a control I/O request from the issued I/O request based on the retrieved entry. For example, in the case of the conversion information 232 of FIG. 4, a control I/O request is generated as follows.

In the case of the entry having "1" in the ID 401, the cooperation control module 230 converts the identification information on the device of the transfer destination of the issued I/O request from the cache memory system 120 to the storage system 130. The cooperation control module 230 converts the hint information of the issued I/O request from "accessed again in the near future" to "no frequent access". The cooperation control module 230 sets the address included in the issued I/O request to the control I/O request. Further, the cooperation control module 230 causes the same data as the data included in the issued I/O request to be included in the control I/O request. As a result of the above-mentioned processing, the control I/O request is generated.

In the case of the entry having "2" in the ID 401, the cooperation control module 230 converts the identification information on the device of the transfer destination of the issued I/O request from the cache memory system 120 to the storage system 130. The cooperation control module 230 converts the hint information of the issued I/O request from "accessed again in the near future" to "no frequent access". The cooperation control module 230 sets the address included in the issued I/O request to the control I/O request. Further, the cooperation control module 230 sets the same dataset management as that of the issued I/O request to the control I/O request. As a result of the above-mentioned processing, the control I/O request is generated.

In the case of the entry having "3" in the ID 401, the cooperation control module 230 converts the identification information on the device of the transfer destination of the issued I/O request from the cache memory system 120 to the storage system 130. The cooperation control module 230 converts the hint information of the issued I/O request from "accessed again in the near future" to "no frequent access". The cooperation control module 230 adds the offset to the address included in the issued I/O request, and sets the calculated address to the control I/O request. Further, the cooperation control module 230 sets the same dataset management as that of the issued I/O request to the control I/O request. As a result of the above-mentioned processing, the control I/O request is generated.

According to the first embodiment, the cooperation control module 230 is configured to generate the control I/O request, but this invention is not limited to this configuration. For example, the cooperation control module 230 may be configured to transmit a generation instruction for the control I/O request to the cache driver 225. On this occasion, the generation instruction includes information on the entry retrieved from the conversion information 232.

Figure 7:
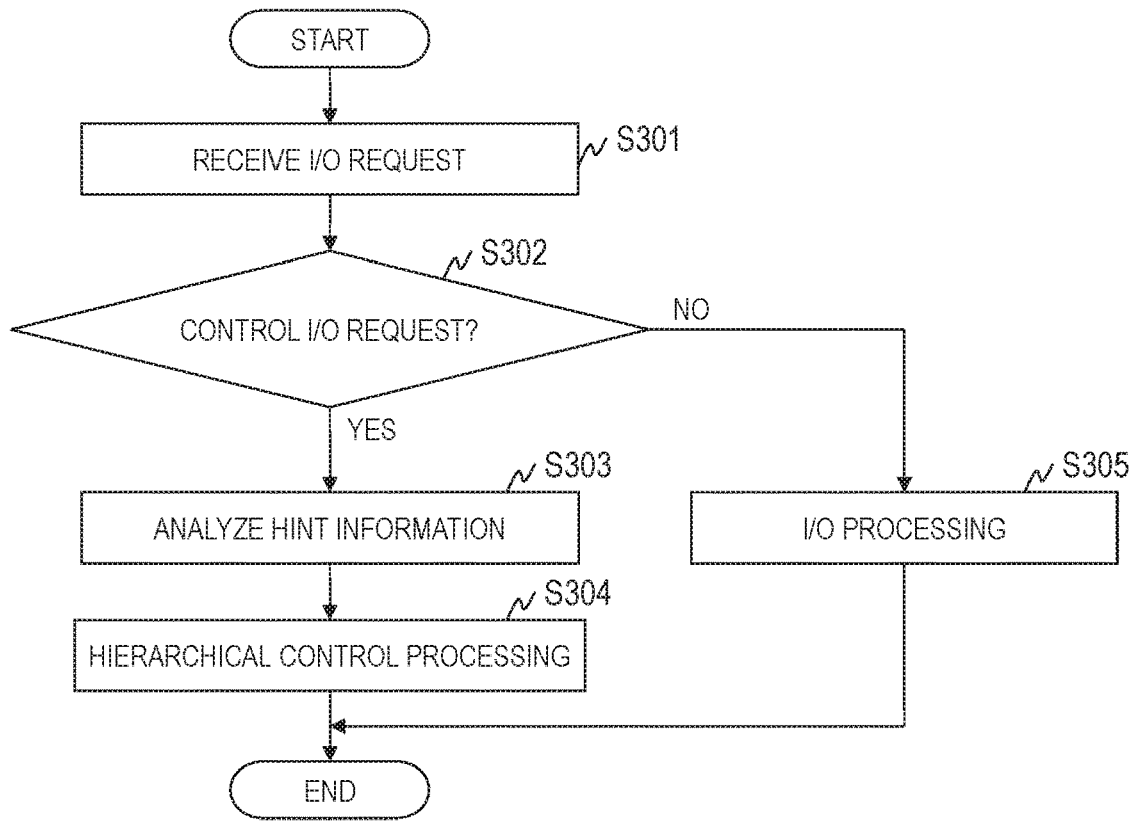
FIG. 7 is a flowchart for illustrating an example of I/O processing carried out by a storage system according to the first embodiment.

Referring to FIG. 7, a description is now given of the processing carried out in a case where the storage system 130 according to the first embodiment receives an I/O request. FIG. 7 is a flowchart for illustrating an example of the I/O processing carried out by the storage system 130 according to the first embodiment.

In a case where the storage system 130 receives an I/O request from the server module 110 (Step S301), the storage system 130 determines whether or not the received I/O request is a control I/O request (Step S302).

Specifically, the hint information analysis module 270 receives the I/O request transmitted from the server module 110, and determines whether or not this I/O request includes hint information. In a case where the I/O request includes hint information, the storage system 130 determines that the received I/O request is a control I/O request. The hint information analysis module 270 may use snooping or the like to monitor the I/O request transmitted from the server module 110.

In a case where it is determined that the received I/O request is a control I/O request, the hint information analysis module 270 analyzes the hint information included in the control I/O request (Step S303). The hint information analysis module 270 instructs the storage control module 275 to carry out predetermined hierarchical control processing based on an analysis result of the hint information.

The storage control module 275 carries out the predetermined hierarchical control processing in accordance with the instruction from the hint information analysis module 270 (Step S304). The storage control module 275 transmits a response to the control I/O request to the server module 110 after the hierarchical control processing is completed. Then, the storage system 130 finishes the processing. A description is now given of an example of the hierarchical control processing carried out by the storage control module 275.

In a case where it is determined that the received I/O request is a control I/O request in Step S302, the hint information analysis module 270 carries out predetermined I/O processing in accordance with the received I/O request (Step S305). The storage control module 275 transmits a response to the I/O request to the server module 110 after the I/O processing is completed. Then, the storage system 130 finishes the processing.

The monitoring information 231 according to the first embodiment includes only entries of the I/O requests transmitted to the cache memory system 120, but may include entries of the I/O requests transmitted to the storage system 130.

For example, in a case of a cache memory system 120 constructed by a nonvolatile memory having high access performance and a small capacity and a storage system 130 constructed by a nonvolatile memory having low access performance and a large capacity, the server module 110 can transmit an I/O request including hint information to this storage system 130. In this case, the above-mentioned entries can be registered to the monitoring information 231.

For example, in a case where the application 200 issues an I/O request for carrying out full scan processing for the data stored in the storage system 130, the cooperation control module 230 transmits a control I/O request including "no frequent access" as hint information to the cache memory system 120. In a case where the cache memory system 120 receives this control I/O request, the cache memory system 120 carries out control of not storing the data read from the storage system 130 in the cache memory system 120. As a result, the storage area of the cache memory system 120 can be effectively used.

In the system configuration according to the first embodiment, the server apparatus 10 and the storage system 130 are apparatus independent of each other, but there may be provided such a system configuration that the server apparatus 10 and the storage system 130 are stored in one housing.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer system, comprising a plurality of first computers, wherein:
each of the plurality of first computers is configured to execute an application;
the each of the plurality of first computers is coupled to a second computer for providing a storage area;
data to be used by the application is stored in the storage area provided by the second computer;
each of the plurality of first computers includes a first processor, a first memory, a cache device to which a cache area for temporarily storing data is set, and a first interface for coupling to another apparatus;
the second computer includes a controller including a second processor, a second memory, and a second interface for coupling to another apparatus, and a plurality of storage apparatus;
the first memory stores an operating system configured to control the first computer upon execution of the operating system by the first processor;
the operating system includes:
a cache driver configured to control data stored in the cache area; and
a cooperation control module configured to:
issue a control input/output (I/O) request for instructing arrangement control for subject data in the computer system based on an analysis result of an I/O request including identification information on an apparatus of a transfer destination and an address for access to the subject data;
analyze an I/O request upon detection of an issuance of the I/O request from the cache driver;
determine whether hint information indicating how the subject data is used by the application is included in the detected I/O request based on an analysis result of the detected I/O request;
generate the control I/O request from the detected I/O request based on the analysis result of the detected I/O request upon determining that the hint information is included in the detected I/O request; and
transfer the control I/O request to an apparatus different from the second computer which is a transfer destination of the detected I/O request,
wherein the second computer to which the detected I/O request is forwarded is configured to transfer data relating to the detected I/O request to the first computer, and
wherein the second computer which receives the control I/O request is configured to move the data relating to the control I/O request to the second memory from at least one of the plurality of storage apparatus without transferring to the first computer.

2. The computer system according to claim 1, wherein:
the cooperation control module is configured to manage monitoring information for determining whether an I/O request is an I/O request subject to the issuance of the control I/O request, and conversion information for generating the control I/O request from the I/O request subject to the issuance of the control I/O request;
the conversion information includes information for converting the hint information included in the I/O request to hint information to be set to the control I/O request; and
the cooperation control module is configured to:
refer, in a case where an I/O request including the hint information is detected, to the monitoring information based on the analysis result of the detected I/O request, thereby determining whether the detected I/O request is the I/O request subject to the issuance of the control I/O request; and
convert the hint information included in the detected I/O request based on the conversion information, thereby generating the control I/O request in a case where it is determined that the detected I/O request is the I/O request subject to the issuance of the control I/O request.

3. The computer system according to claim 2, wherein: the second computer includes:
a control module configured to control the second computer; and
a hint information analysis module configured to monitor reception of the control I/O request to analyze the hint information included in the control I/O request;
the hint information analysis module is configured to:
analyze the hint information included in the control I/O request in a case where the control I/O request is detected; and
instruct the control module to carry out hierarchical control processing for controlling an arrangement of the subject data in the second computer based on an analysis result of the hint information; and
the control module is configured to carry out the hierarchical control processing in accordance with the instruction from the hint information analysis module.

4. The computer system according to claim 3, wherein the cooperation control module is configured to, for generating the control I/O request:
detect the I/O request including identification information on the cache device, the address for the access to the subject data, and first hint information indicating that the subject data is to be accessed in the near future;
convert the identification information on the cache device to identification information on the second computer; and
convert the first hint information to second hint information indicating that there is no frequent access to the subject data.

5. The computer system according to claim 3, wherein the cooperation control module is configured to, for generating the control I/O request:
detect the I/O request including identification information on the cache device, the address for the access to the subject data, attribute information indicating that there is frequent access to the subject data, and third hint information indicating that there is sequential access to the subject data;
convert the identification information on the cache device to identification information on the second computer; and
convert the third hint information to fourth hint information indicating that there is no frequent access to the subject data.

6. The computer system according to claim 3, wherein the cooperation control module is configured to, for generating the control I/O request:
detect the I/O request including identification information on the cache device, the address for the access to the subject data, attribute information indicating that there is no frequent access to the subject data, and fifth hint information indicating that there is sequential access to the subject data;
convert the identification information on the cache device to identification information on the second computer;
convert the address for the access to the subject data; and
convert the fifth hint information to sixth hint information indicating that the subject data is to be accessed in the near future.

7. A computer system, comprising:
a plurality of first computers; and
a second computer coupled to each of the plurality of first computers, wherein:
each of the plurality of first computers is configured to execute an application;
the second computer is configured to provide a storage area for storing data to be used by the application operating on each of the plurality of first computers;
the each of the plurality of first computers includes a first processor, a first memory, a cache device to which a cache area for temporarily storing data is set, and a first interface for coupling to another apparatus;
the second computer includes a controller including a second processor, a second memory, and a second interface for coupling to another apparatus, and a plurality of storage apparatus;
the first memory stores an operating system configured to control the first computer upon execution by the first processor;
the operating system includes:
a cache driver configured to control data stored in the cache area; and
a cooperation control module configured to:
issue a control input/output (I/O) request for instructing arrangement control for subject data in the computer system based on an analysis result of an I/O request including identification information on an apparatus of a transfer destination and an address for access to the subject data;
analyze an I/O request upon detection of an issuance of an I/O request from the cache driver;
determine whether hint information indicating how the subject data is used by the application is included in the detected I/O request based on an analysis result of the detected I/O request;
generate the control I/O request from the detected I/O request based on the analysis result of the detected I/O request upon determining that the hint information is determined to be included in the detected I/O request; and
transfer the control I/O request to an apparatus different from of the second computer which is a transfer destination of the detected I/O request,
wherein the second computer to which the detected I/O request is forwarded is configured to transfer data relating to the detected I/O request to the first computer, and
wherein the second computer which receives the control I/O request is configured to move the data relating to the control I/O request to the second memory from at least one of the plurality of storage apparatus without transferring to the first computer.

8. The computer system according to claim 7, wherein:
the cooperation control module is configured to manage monitoring information for determining whether an I/O request is an I/O request subject to the issuance of the control I/O request, and conversion information for generating the control I/O request from the I/O request subject to the issuance of the control I/O request;
the conversion information includes information for converting the hint information included in the I/O request to hint information to be set to the control I/O request; and
the cooperation control module is configured to:
refer, in a case where an I/O request including the hint information is detected, to the monitoring information based on the analysis result of the detected I/O request, thereby determining whether the detected I/O request is the I/O request subject to the issuance of the control I/O request; and convert the hint information included in the detected I/O request based on the conversion information, thereby generating the control I/O request in a case where it is determined that the detected I/O request is the I/O request subject to the issuance of the control I/O request.

9. The computer system according to claim 8, wherein:
the second computer includes:
a control module configured to control the second computer; and
a hint information analysis module configured to monitor reception of the control I/O request to analyze the hint information included in the control I/O request;
the hint information analysis module is configured to:
analyze the hint information included in the control I/O request in a case where the control I/O request is detected; and
instruct the control module to carry out hierarchical control processing for controlling an arrangement of the subject data in the second computer based on an analysis result of the hint information; and
the control module is configured to carry out the hierarchical control processing in accordance with the instruction from the hint information analysis module.

10. The computer system according to claim 9, wherein:
the cooperation control module is configured to, for generating the control I/O request:
detect the I/O request including identification information on the cache device, the address for the access to the subject data, and first hint information indicating that the subject data is to be accessed to in the near future;
convert the identification information on the cache device to identification information on the second computer; and
convert the first hint information to second hint information indicating that there is no frequent access to the subject data; and
the control module is configured to change an arrangement of the subject data so that the subject data is stored in the storage area lowest in performance in a case where the instruction to carry out the hierarchical control processing is received.

11. The computer system according to claim 9, wherein:
the cooperation control module is configured to, for generating the control I/O request:
detect the I/O request including identification information on the cache device, the address for the access to the subject data, attribute information indicating that there is frequent access to the subject data, and third hint information indicating that there is sequential access to the subject data;
convert the identification information on the cache device to identification information on the second computer; and
convert the third hint information to fourth hint information indicating that there is no frequent access to the subject data; and
the control module is configured to change an arrangement of the subject data so that the subject data is stored in the storage area lowest in performance in a case where the instruction to carry out the hierarchical control processing is received.

12. The computer system according to claim 9, wherein:
the cooperation control module is configured to, for generating the control I/O request:
detect the I/O request including identification information on the cache device, the address for the access to the subject data, attribute information indicating that there is no frequent access to the subject data, and fifth hint information indicating that there is sequential access to the subject data;
convert the identification information on the cache device to identification information on the second computer;
convert the address for the access to the subject data; and
convert the fifth hint information to sixth hint information indicating that the subject data is to be accessed in the near future; and
the control module is configured to change an arrangement of the subject data so that the subject data is stored in the storage area highest in performance in a case where the instruction to carry out the hierarchical control processing is received.

* * * * *